(12) United States Patent
Jung et al.

(10) Patent No.: US 8,399,593 B2
(45) Date of Patent: Mar. 19, 2013

(54) POLYMER, AND COMPOSITION AND FILM INCLUDING THE SAME

(75) Inventors: Young-Suk Jung, Suwon-si (KR); Yoo-Seong Yang, Yongin-si (KR); Byung-Hee Sohn, Yongin-si (KR); Sang-Mo Kim, Hwaseong-si (KR); Eun-Seog Cho, Seoul (KR)

(73) Assignee: Samsung Electronics Co., Ltd. (DE)

( * ) Notice: Subject to any disclaimer, the term of this patent is extended or adjusted under 35 U.S.C. 154(b) by 271 days.

(21) Appl. No.: 12/848,641

(22) Filed: Aug. 2, 2010

(65) Prior Publication Data

US 2011/0105678 A1 May 5, 2011

(30) Foreign Application Priority Data

Oct. 30, 2009 (KR) .................. 10-2009-0104647

(51) Int. Cl.
*C08G 77/22* (2006.01)
(52) U.S. Cl. ............... 528/35; 528/38; 528/26; 528/28
(58) Field of Classification Search .............. 528/38, 528/35, 26, 28
See application file for complete search history.

(56) References Cited

U.S. PATENT DOCUMENTS

| | | | | |
|---|---|---|---|---|
| 4,513,132 | A * | 4/1985 | Shoji et al. | 528/21 |
| 4,737,562 | A * | 4/1988 | Chaudhury et al. | 528/15 |
| 5,473,040 | A * | 12/1995 | Kunimune et al. | 528/26 |
| 6,313,233 | B1 * | 11/2001 | Kurosawa et al. | 525/431 |
| 2003/0120099 | A1 * | 6/2003 | Laine et al. | 556/450 |

FOREIGN PATENT DOCUMENTS

| | | |
|---|---|---|
| JP | 1997-324049 A | 4/1996 |
| KR | 10-1996-0010779 A | 4/1996 |
| KR | 10-2008-0089217 A | 10/2008 |

OTHER PUBLICATIONS

Hedrick, J. L. et al, Polymeric Organic-Inorganic Hybrid Nanocomposites: Preparation of Polyimide-Modified Poly(silsesquioxane) Using Functionalized Poly(amic acid alkyl ester) Precursors, Macromolecules, 1997, 30 (26), pp. 8512-8515.

Zhang, J. et al., A Novel and Facile Method for the Synthesis of Octa(aminophenyl)silsesquioxane and Its Nanocomposites with Bismaleimide-Diamine Resin, J. Applied Polymer Science, vol. 103 (2), pp. 1004-1010, 2006.

Son, M. et al., Organic/Inorganic Hybrid Composite Films from Polyimide and Organosilica: Effect of the Type of Organosilica Precursors, Polymer Bulletin, 2008, 60 (5) : pp. 713-723.

Inagaki, J. et al., Organic / inorganic hybrid polyimides having a cage-type silsesquioxane moiety in the main chain, Polymer Preprints, Japan, v. 54, n. 1, p. 1805, 54th SPSJ Annual Meeting 2005.

* cited by examiner

*Primary Examiner* — Margaret Moore
(74) *Attorney, Agent, or Firm* — Cantor Colburn LLP

(57) ABSTRACT

A polymer including a structure represented by the following Chemical Formula 1, and a composition and a film including the same are provided.

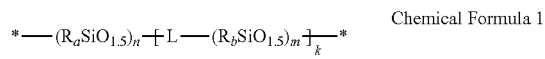

Chemical Formula 1

In the above Chemical Formula 1, each substituent is as defined in the detailed description.

13 Claims, 4 Drawing Sheets

POLYMER, AND COMPOSITION AND FILM INCLUDING THE SAME

CROSS-REFERENCE TO RELATED APPLICATION

This application claims priority to Korean Patent Application No. 10-2009-0104647 filed on Oct. 30, 2009, and all the benefits accruing therefrom under 35 U.S.C. §119, the content of which in its entirety is herein incorporated by reference.

BACKGROUND

1. Field

This disclosure relates to a polymer, and a composition and a film including the same.

2. Description of the Related Art

As the market for mobile display devices expands, there is an increased focus on developing devices that are both light and flexible. In a flexible display, the substrate generally determines the performance, reliability, and price of the display device. The most common substrates are glass, which exhibits excellent properties such as transparency, high heat resistance, and a low coefficient of thermal expansion ("CTE"). However, glass substrates are neither light nor flexible, as desired for future mobile display technology. As a result, there is a need for a new material that satisfies these criteria.

Current plastic substrate candidate materials such as polyimide, polyethylene, and naphthalate do not satisfy exhibit the desired heat resistance, transparency, and flexibility. Therefore, there have been attempts to manufacture a composite material of a polymer and an inorganic material by adding diverse additives, e.g., inorganic materials, to a polymer. However, this approach presents problems in that the additives do not disperse sufficiently in the polymer matrix, and the use of a dispersing agent adversely affects the performance of the polymer.

SUMMARY

One embodiment of this disclosure provides a polymer that is capable of improving thermal properties and optical transmittance properties of films and devices that include the polymer.

Another embodiment of this disclosure provides a composition and a film having improved thermal properties and optical transmittance properties.

According to another embodiment of this disclosure, a polymer including a structure represented by the following Chemical Formula 1 is provided.

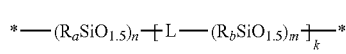

Chemical Formula 1

In the above Chemical Formula 1, n and m are the same or different, and independently range from about 4 to about 12, k is an integer ranging from 1 to about 10, L is a linker of a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, or a substituted or unsubstituted bivalent C1 to C30 amide group, and $R_a$ and $R_b$ are the same or different, and are independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, a substituted or unsubstituted C2 to C15 alkynyl group, $NH_2$, a substituted or unsubstituted C1 to C15 amine group, a substituted or unsubstituted C1 to C15 alkylamine group, or a group represented by the following Chemical Formula 2, provided that at least one of $R_a$ and $R_b$ is $NH_2$, a substituted or unsubstituted C1 to C15 amine group, or a substituted or unsubstituted C1 to C15 alkylamine group.

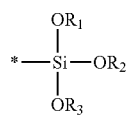

Chemical Formula 2

In the above Chemical Formula 2, $R_1$, $R_2$ and $R_3$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

In certain embodiments, the structure of the above Chemical Formula 1 includes about 5 to about 50 mol % of an amine functional group based on the total moles of the structure of Chemical Formula 1.

Within certain embodiments, the polymer includes the structure of the above Chemical Formula 1 in an amount ranging from about 0.1 to about 50 mol % based on the total moles of the polymer.

In further embodiments, the polymer is a cross-linked polymer including the structure of Chemical Formula 1 in a main chain or in a side chain of the polymer.

Certain polymers including the structure of the above Chemical Formula 1 have a coefficient of thermal expansion that ranges from about 10 to about 100 ppm/° C.

Within further embodiments, the polymer including the structure of the above Chemical Formula 1 is prepared by polymerization of monomers for synthesizing the polymer, a silane compound of the following Chemical Formula 3 and a silane compound of the following Chemical Formula 4.

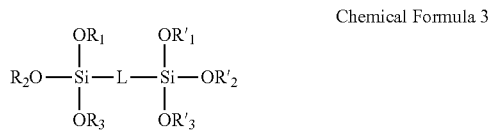

Chemical Formula 3

In the above Chemical Formula 3, $R_1$, $R_2$, $R_3$, $R'_1$, $R'_2$ and $R'_3$ are the same or different, and are independently the same as $R_1$, $R_2$ and $R_3$ in Chemical Formula 2, and L is the same as in Chemical Formula 1.

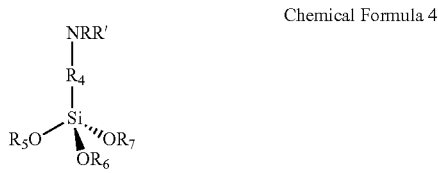

Chemical Formula 4

In the above Chemical Formula 4, $R_4$ is a linker that is a single bond, a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, or a substituted or unsubstituted bivalent C1 to C30 amide group, R and R' are the same or different, and are independently hydrogen, a substituted or unsubstituted C1 to C15 alkyl group, a substituted or unsubstituted C6 to C15 aryl group, or a substituted or unsubstituted C2 to C15 alkenyl group, and $R_5$, $R_6$, and $R_7$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

In certain embodiments, the sum of the amounts of the silane compounds of the above Chemical Formulae 3 and 4 ranges from about 0.1 to about 50 mol % based on the total moles of the monomers for synthesizing the polymer and the silane compound.

In further embodiments, the amount of the silane compound represented in the above Chemical Formula 3 ranges from about 0.1 wt % to about 99.9 wt % based on the total weight of the silane compounds, and the amount of the silane compound of the above Chemical Formula 4 ranges from about 99.9 wt % to about 0.1 wt % based on the total weight of silane compounds.

Within further embodiments, the polymer including the structure of the above Chemical Formula 1 may be prepared by adding a silane compound of the following Chemical Formula 5 to a monomer for synthesizing a polymer, a silane compound of the above Chemical Formula 3, and a silane compound of Chemical Formula 4.

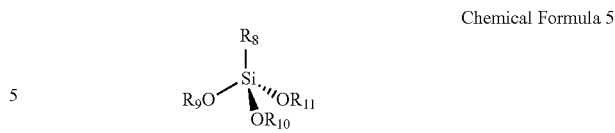

Chemical Formula 5

In the above Chemical Formula 5, $R_8$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, or a substituted or unsubstituted C2 to C15 alkynyl group, and $R_9$, $R_{10}$, and $R_{11}$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

Within further embodiments, the silane compound of the above Chemical Formula 5 may be added in an amount ranging from about 0.1 to about 100 parts by weight based on 100 parts by weight of the silane compound of Chemical Formula 3.

In representative embodiments, the polymer includes polyamic acid, polyimide, polyaramide, polyamide, polyurethane, or a combination thereof.

According to another embodiment of this disclosure, a composition including a polymer as described above provided.

According to another embodiment of this disclosure, a film including a polymer as described above is provided.

Hereinafter, further embodiments will be described in further detail.

DETAILED DESCRIPTION

Figure 1:
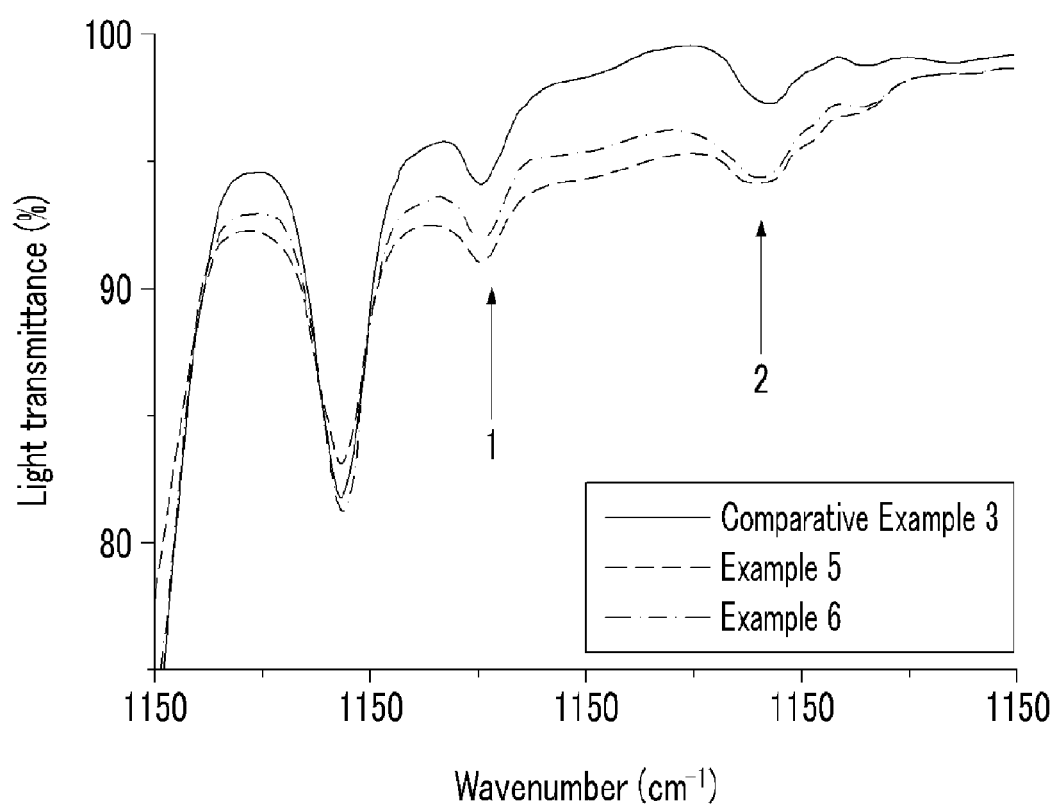
FIG. 1 is a spectrum illustrating the structural analysis of the films of Examples 5 and 6 and a polyimide film of Comparative Example 3 obtained using Fourier transform infrared spectroscopy ("FT-IR") analysis.

This disclosure will be described more fully hereinafter in the following detailed description of the invention, and with reference to the accompanying drawings, in which some but not all embodiments of the disclosure are described. This disclosure may, however, be embodied in many different forms and is not to be construed as limited to the exemplary embodiments set forth herein; rather, these embodiments are provided so that this disclosure will be thorough and complete, and will fully convey the scope of the invention to those skilled in the art. Like reference numerals and variables refer to like elements throughout.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which this invention belongs.

As used herein, when a definition is not otherwise provided, the term "substituted" refers to a compound or radical substituted with at least one (e.g., 1, 2, 3, 4, 5, 6 or more) substituents independently chosen from a C1 to C10 alkoxy group, a carboxyl group, a C1 to C10 alkyl group, a C2 to C10 alkenyl group, a C2 to C10 alkynyl group, a C3 to C10 cycloalkyl group, 3- to 10-membered heterocycloalkyl group, a C6 to C20 aryl group, or a 5- to 20-membered heteroaryl group.

"Alkyl," as used herein, refers to a straight or branched chain saturated aliphatic hydrocarbon. Alkyl groups include, for example, groups having from 1 to 50 carbon atoms (C1-C50 alkyl). "Alkenyl" is a straight or branched chain hydrocarbon that includes at least one carbon-carbon double bond; and "alkynyl" refers to a straight or branched chain hydrocarbon that has one or more unsaturated carbon-carbon bonds, at least one of which is a triple bond.

"Fluoroalkyl" refers to an alkyl group in which at least one hydrogen is replaced with fluorine.

The term "cycloalkyl" refers to a group that includes one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups. Cycloalkyl groups do not include an aromatic ring or a heterocyclic ring.

An "cycloalkyloxy" is a cycloalkyl group as described above that is linked via an oxygen (i.e., —O-cycloalkyl).

"Alkoxy," as used herein, refers to an alkyl moiety that is linked via an oxygen (i.e., —O-alkyl).

"C1 to C30 amide" refers to a group of the formula —C(O)—N($R_x$)($R_y$) or —N—C(O)—$R_x$, wherein $R_x$ is a C1 to C30 alkyl, a C1 to C30 alkenyl, a C1 to C30 alkynyl, a C3 to C30 cycloalkyl or a C6 to C30 aryl; and $R_y$ is hydrogen or any of the groups listed for $R_x$.

As used herein, a "C1 to C15 amine group" is a group of the formula —N($R_w$)($R_z$), wherein $R_w$ is a C1 to C15 alkyl, a C1 to C15 alkenyl, a C1 to C15 alkynyl, a C3 to C15 cycloalkyl or a C6 to C15 aryl; and $R_z$ is hydrogen or any of the groups listed for $R_w$.

A "C1 to C15 alkylamine group" is a group of the formula -Q-N($R_w$)($R_z$), wherein Q is a C1 to C15 alkenylene, and $R_w$ and $R_z$ are independently hydrogen, a C1 to C14 alkyl, a C1 to C14 alkenyl, a C1 to C14 alkynyl, a C3 to C14 cycloalkyl or a C6 to C14 aryl; such that the total number of carbon atoms in Q, $R_w$ and $R_z$ ranges from 1 to 15.

"Aryl," as used herein means a cyclic moiety in which all ring members are carbon and at least one ring is aromatic. More than one ring may be present, and any additional rings may be independently aromatic, saturated or partially unsaturated, and may be fused, pendant, spirocyclic or a combination thereof.

Through the present disclosure, reference is made to various heterocyclic groups. Within such groups, the term "hetero" refers to a group that includes at least one ring member that is a heteroatom (e.g., 1 to 3 heteroatoms that are independently N, O, S, P, or Si). In each instance, the total number of ring members may be indicated (e.g., a 3- to 10-membered heterocycloalkyl). If multiple rings are present, each ring is independently aromatic, saturated or partially unsaturated and multiple rings, if present, may be fused, pendant, spirocyclic or a combination thereof. Heterocycloalkyl groups include at least one non-aromatic ring that contains a heteroatom ring member. Heteroaryl groups include at least one aromatic ring that contains a heteroatom ring member. Non-aromatic and/or carbocyclic rings may also be present in a heteroaryl group, provided that at least one ring is both aromatic and contains a ring member that is a heteroatom.

Throughout this disclosure, reference is made to various bivalent moieties. Such moieties are the same as the monovalent groups that are similarly named. For example, an "alkylene" moiety is a bivalent alkyl group; and an "alkyleneoxy" moiety is a bivalent alkyl group in which one of the carbon atoms is replaced with an oxygen atom. A C6 to C15 arylene group is a bivalent linking group that has the same structure as a C6 to C15 aryl group, and a 5- to 15-membered heteroarylene group is a bivalent linking group having the same structure as a 5- to 15-membered heteroaryl group. An "aryleneoxy" moiety is a bivalent aryl group that is linked at one point via an oxygen (—O—).

According to one embodiment, a polymer including a structure represented by the following Chemical Formula 1 is provided.

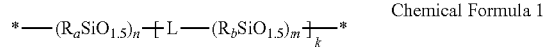

Chemical Formula 1

In the above Chemical Formula 1, n and m are the same or different and independently range from about 4 to about 12 (for example, 4, 6, 8, 10, or 12), k is an integer ranging from 1 to about 10, L is a linker that is a substituted or unsubstituted C1 to C30 alkylene group (for example a substituted or unsubstituted C1 to C12 alkylene group), a substituted or unsubstituted C1 to C30 alkyleneoxy group (for example a substituted or unsubstituted C1 to C12 alkyleneoxy group), a substituted or unsubstituted C1 to C30 fluoroalkylene group (for example a substituted or unsubstituted C1 to C12 fluoroalkylene group), a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, or a substituted or unsubstituted bivalent C1 to C30 amide group, $R_a$ and $R_b$ are the same or different, and are independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, a substituted or unsubstituted C2 to C15 alkynyl group, $NH_2$, a substituted or unsubstituted C1 to C15 amine group, a substituted or unsubstituted C1 to C15 alkylamine group, or a functional group represented by the following Chemical Formula 2, provided that at least of $R_a$ and $R_b$ is $NH_2$, a substituted or unsubstituted C1 to C15 amine group, or a substituted or unsubstituted C1 to C15 alkylamine group.

Chemical Formula 2

In the above Chemical Formula 2, $R_1$, $R_2$, and $R_3$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

In the above Chemical Formula 1, n and m independently range from about 4 to about 12. When they are 4, each individual $(R_aSiO_{1.5})_n$ or $(R_bSiO_{1.5})_m$ typically forms a random branched structure, and when they are 6, each individual $(R_aSiO_{1.5})_n$ or $(R_bSiO_{1.5})_m$ typically forms a cage or partial cage structure. When they are greater than 8, each individual $(R_aSiO_{1.5})_n$ or $(R_bSiO_{1.5})_m$ typically forms a cage structure.

In certain embodiments, a polymer as described herein is an organic polymer of polyamic acid, polyimide, polyaramide, polyamide, polyurethane, or a combination thereof.

A silane compound or silsesquioxane-based silane compound is sometimes added to an organic polymer in order to improve physical properties. However, since a free alkyl group at a terminal is highly mobile, the addition of a silane or silsesquioxane-based silane tends to increase the coefficient of thermal expansion of the polymer, thereby adversely affecting the thermal property of a polymer film.

According to one embodiment, an organic silicate compound including more than 2 silsesquioxanes connected through a hydrocarbon group (L) is introduced to a main chain or side chain of a polymer. In this embodiment, the free terminal alkyl groups are decreased, thereby reducing the mobility of the terminal group and decreasing the coefficient of thermal expansion. In addition, when a film is formed of the polymer, the coefficient of thermal expansion of the film is reduced and the light transmittance may be improved.

Within certain embodiments, the structure of the above Chemical Formula 1 may be included in an amount ranging from about 0.1 to about 50 mol % based on the total moles of the polymer. According to another embodiment, the structure of the above Chemical Formula 1 may be included in an amount ranging from about 0.1 to about 25 mol % based on the total moles of the polymer. According to yet another embodiment, the structure of the above Chemical Formula 1 may be included in an amount ranging from about 0.1 to about 10 mol % based on the total moles of the polymer. When the structure of the Chemical Formula 1 is included within the range, the thermal properties, optical characteristics, and mechanical properties may all be improved.

In certain embodiments, the polymer including the structure of the above Chemical Formula 1 has a coefficient of thermal expansion of about 10 to about 100 ppm/° C. In addition, the structure of the above Chemical Formula 1 typically forms a cross-linking structure in the polymer, thereby improving mechanical properties.

The structure of the above Chemical Formula 1 may, in certain embodiments, include an amine functional group in an amount of about 5 to about 50 mol % based on the total moles of the structure represented in Chemical Formula 1. According to another embodiment, the amine functional group may be included in an amount ranging from about 5 to about 25 mol % based on the total moles of the structure represented by Chemical Formula 1. When the amine functional group is included within this range, the miscibility and the compatibility with the polymer main chain having an amine group or an amide group may be improved.

The polymer including the structure of the above Chemical Formula 1 may be prepared by polymerizing a monomer for synthesizing the polymer, a silane compound of the following Chemical Formula 3, and a silane compound of the following Chemical Formula 4.

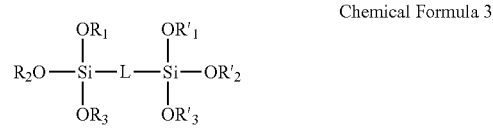

Chemical Formula 3

In the above Chemical Formula 3, $R_1$, $R_2$, $R_3$, $R'_1$, $R'_2$, and $R'_3$ are the same or different, and are independently the same as $R_1$, $R_2$, and $R_3$ in Chemical Formula 2, and L is the same as in Chemical Formula 1.

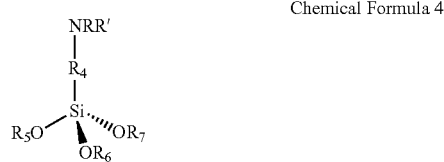

Chemical Formula 4

In the above Chemical Formula 4, $R_4$ is a linker of a single bond, a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, or a substituted or unsubstituted bivalent C1 to C30 amide group, R and R' are the same or different, and are independently hydrogen, a substituted or unsubstituted C1 to C15 alkyl group, a substituted or unsubstituted C6 to C15 aryl group, or a substituted or unsubstituted C2 to C15 alkenyl group, and $R_5$, $R_6$, and $R_7$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

The monomer for synthesizing the polymer may be selected based on the polymer. For example, in case of polyamic acid or polyimide, an amine compound with acid dianhydride or acid dianhydride may be used as the monomer. Monomers that can be used for synthesis of different polymers will be apparent to those of ordinary skill in the art.

In certain embodiments, the silane compounds of the above Chemical Formulae 3 and 4 may be used in an amount ranging from about 0.1 to about 50 mol % based on the sum of the moles of silane compounds and the moles of monomer for synthesizing the polymer. According to another embodiment, the silane compounds of the above Chemical Formulae 3 and 4 may be used in an amount ranging from about 0.1 to about 25 mol % based on the sum of the moles of silane compounds and moles of the monomer for synthesizing the polymer. According to yet another embodiment, the silane compounds of the above Chemical Formulae 3 and 4 may be used in an amount ranging from about 0.1 to about 10 mol % based on the sum of the moles of silane compounds and moles of the monomer for synthesizing the polymer. When the silane compounds are used within the above range, the thermal properties and the optical properties of the polymer may be improved.

The silane compound of the above Chemical Formula 3 is generally used in an amount ranging from about 0.1 to about 99.9 wt % based on the total weight of the silane compound, and the silane compound of the above Chemical Formula 4 is generally used in an amount ranging from about 99.9 to about 0.1 wt % based on the total weight of the silane compound. According to another embodiment, the silane compound of the above Chemical Formula 3 may be used in an amount ranging from about 20 to about 50 wt % based on the total weight of the silane compound, and the silane compound of the above Chemical Formula 4 may be used in an amount ranging from about 80 to about 50 wt % based on the total weight of the silane compound. When the silane compounds are used within these ranges, the amount of the amine functional group represented by the above Chemical Formula 1 may be readily controlled to a desired amount.

Also, the organic silicate compound additive represented by the above Chemical Formula 1 may be acquired by adding the silane compound of the following Chemical Formula 5 to the silane compounds of the above Chemical Formulae 3 and 4.

Chemical Formula 5

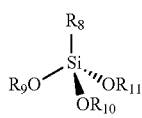

In the above Chemical Formula 5, $R_8$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, or a substituted or unsubstituted C2 to C15 alkynyl group, and $R_9$, $R_{10}$, and $R_{11}$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

The silane compound of the above Chemical Formula 5 may generally be used in an amount ranging from about 0.1 to about 100 parts by weight based on 100 parts by weight of the silane compound represented by Chemical Formula 3. When the silane compound is used within the range, the amount of the amine functional group represented by the above Chemical Formula 1 may be readily controlled into a desired range.

The compounds of Chemical Formulae 3, 4, and 5 form a siloxane bond at a low temperature through a hydrolysis reaction, and thus form a siloxane bond during polymer synthesis. Therefore, an additional step is not required. The siloxane bond further may improve the mechanical properties of the polymer.

According to another embodiment, a composition including one or more polymers as described herein is provided.

The composition may further include a solvent (e.g., to provide better coating properties). Examples of solvents include dimethylsulfoxide; N-methyl-2-pyrrolidone; N,N-dimethyl formamide ("DMF"); N,N-dimethyl acetamide ("DMAc"); N-methylformamide ("NMF"); alcohols including methanol, ethanol, 2-methyl-1-butanol, 2-methyl-2-butanol, or a combination thereof; ketones including γ-butyrolactone, cyclohexanone, 3-hexanone, 3-heptanone, 3-octanone, acetone, methyl ethyl ketone, or a combination thereof; tetrahydrofuran; trichloroethane; or a combination thereof; but are not limited thereto. Such a solvent may be used singularly or in a combination of two or more.

According to another embodiment, a film including at least one polymer as described herein is provided.

In certain embodiments, the film may have a coefficient of thermal expansion ranging from about 10 to about 100 ppm/° C.

In further embodiments, the film may be applied to a substrate for a device, an optical film, an integrated circuit ("IC") package, an adhesive film, a multi-layer flexible printed circuit ("FPC"), or a tape.

Hereinafter, the embodiments are illustrated in more detail with reference to examples. However, the following are exemplary embodiments and are not limiting.

Example 1

Polymer Synthesis

About 1304 mg of bicyclo[2.2.2]oct-7-ene-2,3,5,6-tetracarboxylic dianhydride ("BTDA") and about 475 mg of amino(trimethoxy)silane ("APTMS") are agitated in a 500 mL round-bottomed flask in the presence of dimethyl acetamide ("DMAc") for about 17 hours. About 3740 mg of bis(triethoxysilylethane) ("BTSE") and about 1 g of $H_2O$ are dissolved in DMAc, put into the flask for agitation, and agitated for about 5 hours to thereby produce a polyamic acid polymer including a silsesquioxane structure in an amount of about 50 mol %.

Example 2

Polymer Synthesis

About 657 mg of bicyclo[2.2.2]oct-7-ene-2,3,5,6-tetracarboxylic dianhydride ("BTDA") and about 9.5 mg of amino (trimethoxy)silane ("APTMS") are agitated in a 500 mL round-bottomed flask in the presence of dimethyl acetamide ("DMAc") for about 5 hours. Subsequently, about 1133 mg of 2,2-bis[4-(3-aminophenoxy)benzene] ("m-BAPS") is added thereto and agitated for 17 hours. About 37.5 mg of bis(triethoxysilylethane) ("BTSE"), about 7.2 mg of methyl(trimethoxysilane) ("MTMS"), and about 40 mg of $H_2O$ are dissolved in DMAc, put into the flask for agitation, and agitated for about 5 hours to thereby produce polyamic acid including a silsesquioxane structure in an amount of about 0.14 mol %.

Example 3

Polymer Synthesis

About 658 mg of bicyclo[2.2.2]oct-7-ene-2,3,5,6-tetracarboxylic dianhydride ("BTDA") and about 19 mg of aminopropyl(trimethoxy)silane ("APTMS") are agitated in a 500 mL round-bottomed flask in the presence of dimethyl acetamide ("DMAc") for about 5 hours. Subsequently, about 1112 mg of 2,2-bis[4-(3-aminophenoxy)benzene] ("m-BAPS") is added thereto and agitated for about 17 hours. About 74 mg of bis(triethoxysilylethane) ("BTSE") and about 15 mg of methyl(trimethoxysilane) ("MTMS"), about 40 mg of $H_2O$ are dissolved in DMAc, put into the flask for agitation, and agitated for about 5 hours to thereby produce polyamic acid including a silsesquioxane structure in an amount of about 0.29 mol %.

Comparative Example 1

Polymer Synthesis

About 657 mg of bicyclo[2.2.2]oct-7-ene-2,3,5,6-tetracarboxylic dianhydride ("BTDA") and about 1144 mg of 2,2-bis[4-(3-aminophenoxy)benzene] ("m-BAPS") are put into a 500 mL round-bottomed flask and agitated for about 17 hours to thereby produce polyamic acid.

Comparative Example 2

Polymer Synthesis

About 657 mg of bicyclo[2.2.2]oct-7-ene-2,3,5,6-tetracarboxylic dianhydride ("BTDA") and about 9.5 mg of aminopropyl(trimethoxy)silane ("APTMS") are agitated in a 500 mL round-bottomed flask in the presence of dimethyl acetamide (DMAc) for about 5 hours. Subsequently, about 1133 mg of 2,2-bis[4-(3-aminophenoxy)benzene] ("m-BAPS") is added to the reaction and agitated for about 17 hours. About 7.2 mg of methyl(trimethoxysilane) ("MTMS") and about 40 mg of $H_2O$ are dissolved in DMAc, put into the flask for agitation, and agitated for about 5 hours to thereby produce polyamic acid including a silsesquioxane structure in an amount of about 0.25 mol %.

Examples 4 to 6 and Comparative Examples 3 and 4

Fabrication of Film

The polymers produced according to Examples 1 to 3 and Comparative Examples 1 and 2 are separately applied onto glass substrates treated with octyltrichlorosilane, undergo $N_2$ purging at about 50° C. for about 1 hour and allowed to stand under vacuum at about 80° C. for about 1 hour. The temperature thereof is then increased to about 250° C. at a speed of about 1° C. per minute. Subsequently, heat treatment is performed under a nitrogen ($N_2$) atmosphere for about 1 hour to thereby fabricate the films of Examples 4 to 6 and Comparative Examples 3 and 4.

Infrared Spectroscopy Analysis

FIG. 1 shows a structural analysis result of films of Examples 5 and 6 and a polyimide film of Comparative Example 3 obtained by using an infrared spectroscopy analysis method ("FT-IR"). As shown in FIG. 1, the Si—O—Si stretching peak (peak 1) and Si—$CH_3$ wagging peak (peak 2) increase at about 1070 $cm^{-1}$ and 1020 $cm^{-1}$ according to the content of an organic silicate compound additive, respectively.

Detection of Cross-Linking Polymer

The films of Examples 4 to 6 and Comparative Example 3 are added to each solvent and their dissolving property is observed with the naked eye. The results are shown in the following Table 1. In Table 1, O denotes that a film is completely dissolved and X denotes that a film is not dissolved.

TABLE 1

|  | Comparative Example 3 | Example 4 | Example 5 | Example 6 |
|---|---|---|---|---|
| dimethyl acetamide ("DMAc") | O | X | X | X |
| N-methylpyrrolidone ("NMP") | O | X | X | X |
| dimethylsulfoxide ("DMSO") | O | X | X | X |
| dimethyl formamide ("DMF") | O | X | X | X |

It may be seen from Table 1 that the polymers of Examples 4 to 6 are cross-linked polymers.

Thermal Property

Figure 2:
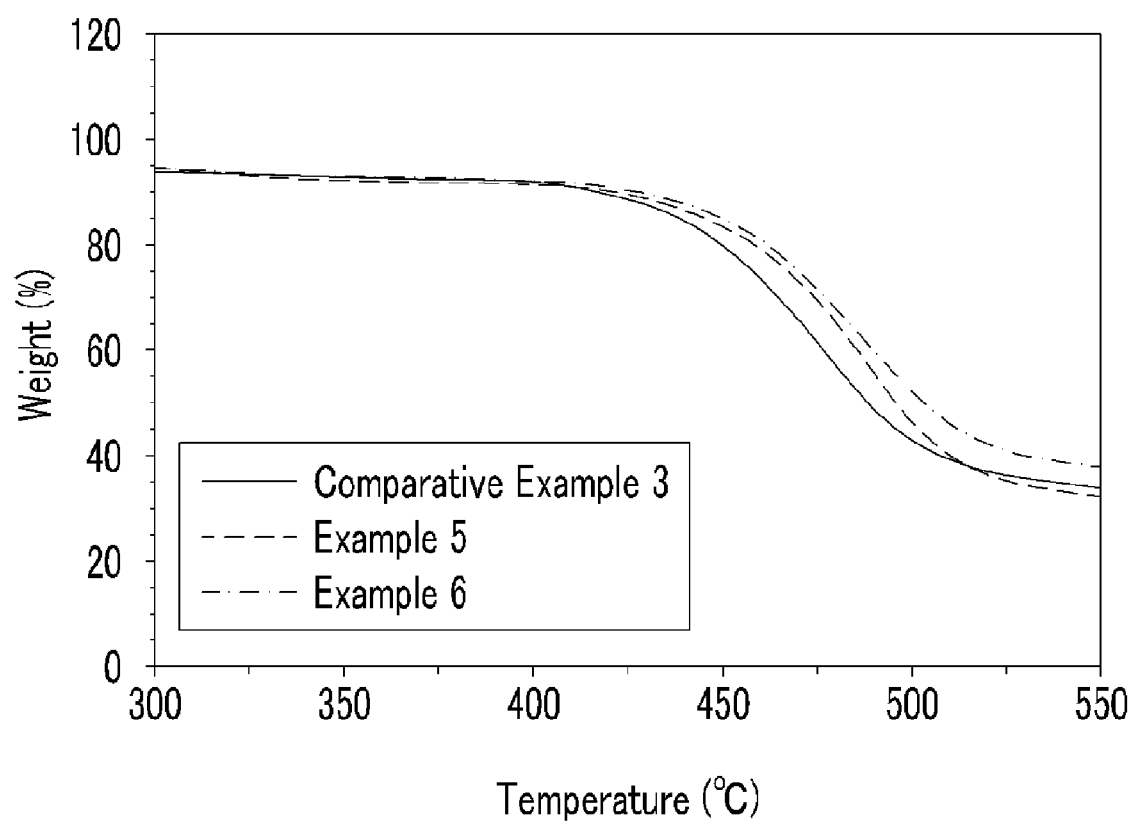
FIG. 2 is a graph (weight percent vs. temperature in ° C.) illustrating the results of thermogravimetric analysis ("TGA") of the films of Examples 5 and 6 and a polyimide film of Comparative Example 3.
Figure 3:
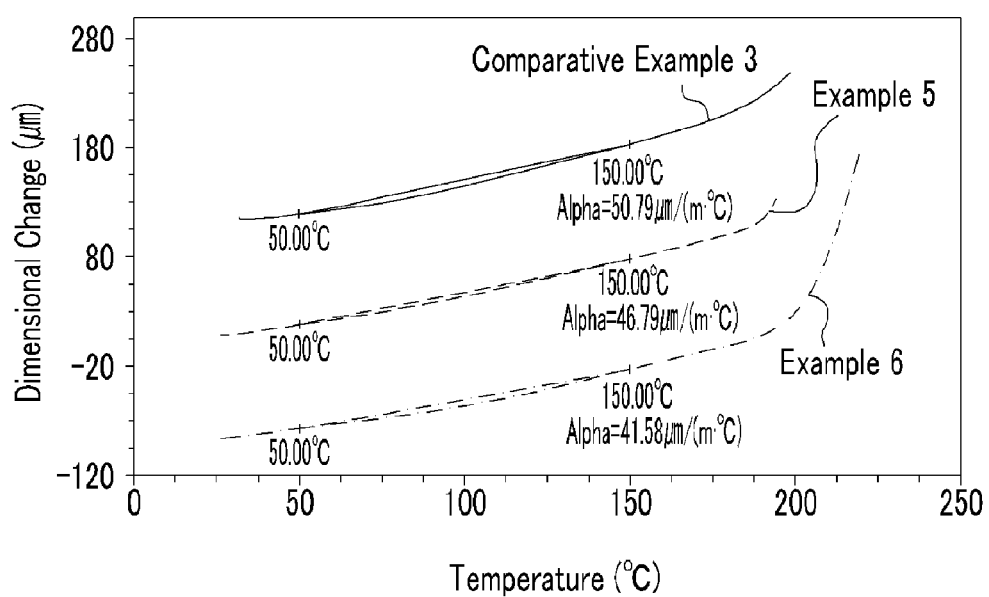
FIG. 3 is a graph illustrating dimensional change (μm) vs. temperature (° C.), and the resulting coefficients of thermal expansion ("CTE"), of films of Examples 5 and 6 and a polyimide film of Comparative Example 3.

FIG. 2 shows a thermogravimetric analysis ("TGA") result of the films of Examples 5 and 6 and a polyimide film of Comparative Example 3 under the conditions of 10° C./min, 600° C., $N_2$: 35 mL/min, Universal V4.5A TA instruments. It may be seen from FIG. 2 that films of Examples 5 and 6 have a thermal decomposition temperature that is 30° C. higher than the polyimide film of Comparative Example 3. FIG. 3 shows coefficients of thermal expansion ("CTE") of the films of Examples 5 and 6 and a polyimide film of Comparative Example 3 calculated by measuring dimension changes according to the temperature. As shown in FIG. 3, as the content of an organic silicate structure increases, the coefficient of thermal expansion ("CTE") decreases. The coefficient of thermal expansions of the films fabricated according to Examples 5 and 6 including polymers including the organic silicate structure in the amounts of about 0.14 mol % and about 0.29 mol %, respectively, are decreased to about 46.79 ppm/° C. and about 41.58 ppm/° C.

Optical Properties

To evaluate the optical properties of the films fabricated according to Examples 5 and 6 and Comparative Examples 3 and 4, light transmittance and yellow index ("YI") are measured with a KONICA MINOLTA Spectrophotometer. The measurement results are as shown in the following Table 2.

TABLE 2

|  | Light transmittance (%) | Yellow index (YI) |
|---|---|---|
| Comparative Example 3 | 86 | 7.7 |
| Comparative Example 4 | 88 | 5.0 |
| Example 5 | 92 | 2.4 |
| Example 6 | 90 | 4.8 |

As shown in Table 2, the films of Examples 4 and 5 using polymers that include the organic silicate structure show an improvement in light transmittance and yellow index, compared with the polyimide film fabricated according to Comparative Example 3 that does not include the organic silicate structure. In contrast, the film fabricated according to Comparative Example 4 using a polymer including a single silsesquioxane structure shows little improvement in the light transmittance and yellow index.

Mechanical Properties

Figure 4:
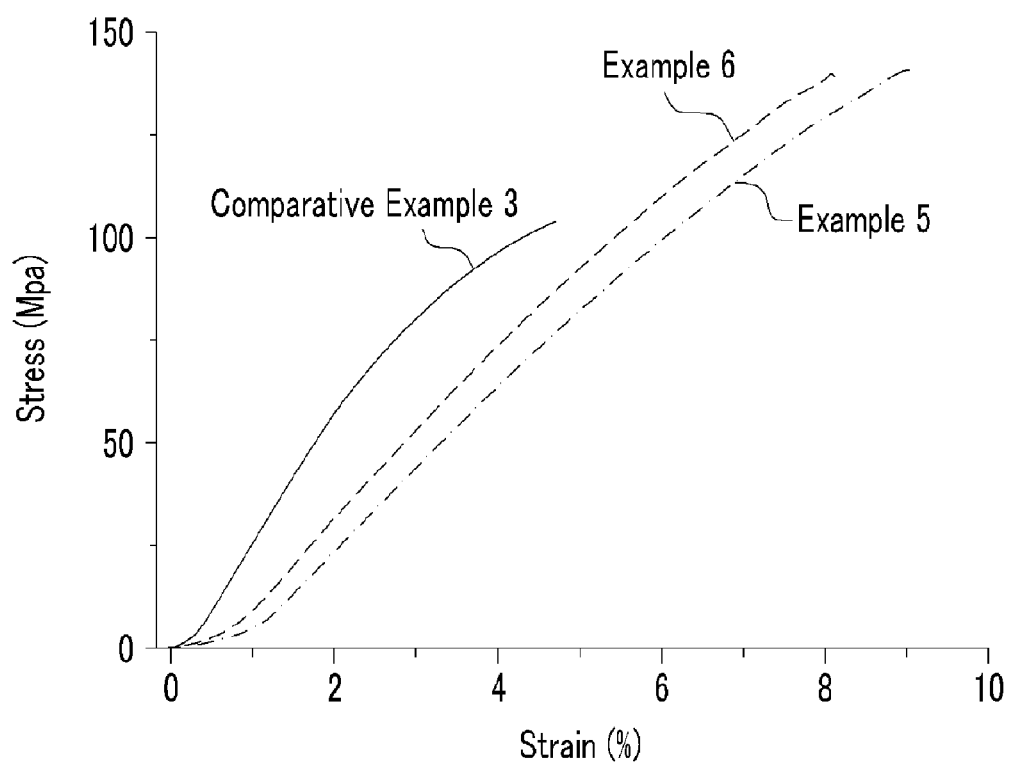
FIG. 4 is a graph of stress (mpa) vs. strain (%), illustrating a strain measurement result obtained for the films of Examples 5 and 6 and a polyimide film of Comparative Example 3.

FIG. 4 shows the results of strain measurement analysis performed on the films of Examples 5 and 6 and a polyimide film of Comparative Example 3 using a universal testing machine ("UTM"), produced by Simatsu Company. As shown in FIG. 4, the polyimide film shows strain of less than about 5%, while the films of Examples 5 and 6 show strains of about double that. Also, the ultimate strengths of the films of Examples 5 and 6 are increased, compared with the polyimide film of Comparative Example 3. Therefore, it may be seen from the results that the polyimide film having the organic silicate structure is more flexible and has toughness and elongation characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer comprising a structure represented by the following Chemical Formula 1:

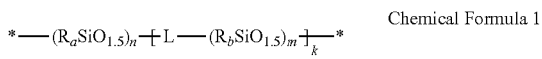

Chemical Formula 1 wherein, in the above Chemical Formula 1, n and m are the same or different, and independently range from about 4 to about 12, k is an integer ranging from 1 to about 10, L is a linker of a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, or a substituted or unsubstituted bivalent C1 to C30 amide group, $R_a$ and $R_b$ are the same or different, and are independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, a substituted or unsubstituted C2 to C15 alkynyl group, $NH_2$, a substituted or unsubstituted C1 to C15 amine group, a substituted or unsubstituted C1 to C15 alkylamine group, or a group represented by the following Chemical Formula 2, provided that at least of $R_a$ and $R_b$ is $NH_2$, a substituted or unsubstituted C1 to C15 amine group, or a substituted or unsubstituted C1 to C15 alkylamine group,

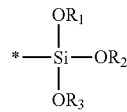

Chemical Formula 2 wherein, in the above Chemical Formula 2, $R_1$, $R_2$, and $R_3$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group; and wherein the structure of the above Chemical Formula 1 is present is an amount ranging from about 0.1 to about 50 mol % based on the total moles of the polymer.

2. The polymer of claim 1, wherein the structure of the above Chemical Formula 1 comprises about 5 to about 50 mol % of an amine functional group based on the total moles of the structure of Chemical Formula 1.

3. The polymer of claim 1, wherein the polymer is a cross-linked polymer comprising the structure of Chemical Formula 1 in a main chain or at a side chain of the polymer.

4. The polymer of claim 1, wherein the polymer has a coefficient of thermal expansion ranging from about 10 to about 100 ppm/° C.

5. The polymer of claim 1, wherein the polymer comprising the structure of Chemical Formula 1 is prepared by polymerization of a silane compound of the following Chemical Formula 3, and a silane compound of the following Chemical Formula 4:

Chemical Formula 3

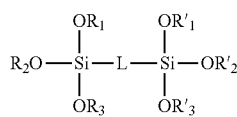

wherein, in the above Chemical Formula 3, $R_1$, $R_2$, $R_3$, $R'_1$, $R'_2$, and $R'_3$ are the same or different, and are independently the same as $R_1$, $R_2$, and $R_3$ in Chemical Formula 2, and L is the same as in Chemical Formula 1, and Chemical Formula 4

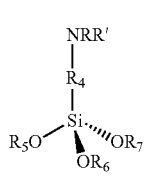

wherein, in the above Chemical Formula 4, $R_4$ is a linker of a single bond, a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, and a substituted or unsubstituted bivalent C1 to C30 amide group, R and R' are the same or different, and are independently hydrogen, a substituted or unsubstituted C1 to C15 alkyl group, a substituted or unsubstituted C6 to C15 aryl group, or a substituted or unsubstituted C2 to C15 alkenyl group, and $R_5$, $R_6$, and $R_7$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group; and additional monomers for synthesizing the polymer other than the silane compound of Chemical Formula 3 and the silane compound of Chemical Formula 4.

6. The polymer of claim 5, wherein the sum of the amounts of the silane compounds of the above Chemical Formulae 3 and 4 ranges from about 0.1 to about 50 mol % based on the total moles of the additional monomers for synthesizing the polymer and the silane compound.

7. The polymer of claim 5, wherein the amount of the silane compound of Chemical Formula 3 ranges from about 0.1 wt % to about 99.9 wt %, and the amount of the silane compound of Chemical Formula 4 ranges from about 99.9 to about 0.1 wt %, based on the total weight of the compounds of Chemical Formula 3 and Chemical Formula 4.

8. The polymer of claim 5, wherein the polymer comprising the structure of Chemical Formula 1 is prepared by adding a silane compound of the following Chemical Formula 5 to the additional monomers for synthesizing the polymer, the silane compound of Chemical Formula 3, and the silane compound of Chemical Formula 4:

[Chemical Formula 5]

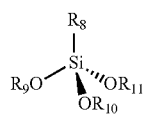

wherein, in the above Chemical Formula 5, $R_8$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, or a substituted or unsubstituted C2 to C15 alkynyl group, and $R_9$, $R_{10}$, and $R_{11}$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

9. The polymer of claim 8, wherein the silane compound of Chemical Formula 5 is added in an amount ranging from about 0.1 to about 100 parts by weight based on 100 parts by weight of the silane compound of Chemical Formula 3.

10. The polymer of claim 1, wherein the polymer comprises polyamic acid, polyimide, polyaramide, polyamide, polyurethane, or a combination thereof.

11. A composition comprising the polymer of claim 1.

12. The composition of claim 11, wherein the composition further comprises a solvent.

13. A film comprising the polymer of claim 1.

* * * * *